(12) United States Patent
Eisberg et al.

(10) Patent No.: US 7,947,177 B2
(45) Date of Patent: May 24, 2011

(54) PRESSURE VESSELS FOR HOLDING CYLINDRICAL FILTRATION CARTRIDGES

(75) Inventors: Douglas W. Eisberg, Escondido, CA (US); Terry E. Gilbertson, Prescott Valley, AZ (US); Andrew Panlasigui, San Diego, CA (US); John Mazrum, Cheshire, OR (US)

(73) Assignee: Protec Arisawa America, Inc., Vista, CA (US)

( * ) Notice: Subject to any disclaimer, the term of this patent is extended or adjusted under 35 U.S.C. 154(b) by 768 days.

(21) Appl. No.: 11/550,906

(22) Filed: Oct. 19, 2006

(65) Prior Publication Data
US 2007/0199878 A1 Aug. 30, 2007

Related U.S. Application Data

(63) Continuation of application No. PCT/US2005/013277, filed on Apr. 18, 2005.

(60) Provisional application No. 60/564,774, filed on Apr. 22, 2004.

(51) Int. Cl.
*B01D 63/00* (2006.01)
(52) U.S. Cl. ........... 210/321.8; 210/321.89; 210/321.69; 210/650
(58) Field of Classification Search ............. 210/321.72, 210/321.8, 321.89, 321.69, 650
See application file for complete search history.

(56) References Cited

U.S. PATENT DOCUMENTS

| | | |
|---|---|---|
| 3,880,755 A | 4/1975 | Thomas et al. |
| 4,083,780 A | 4/1978 | Call |
| 4,296,951 A | 10/1981 | Zimmerly |

(Continued)

FOREIGN PATENT DOCUMENTS

DE 40 39 967 A1 6/1992

(Continued)

OTHER PUBLICATIONS

Mark C. Porter, ed., "Handbook of Industrial Membrane Technology," 1990, Noyes Publications, Westwood, New Jersey, pp. 276-277.*

(Continued)

*Primary Examiner* — Walter D Griffin
*Assistant Examiner* — Denise R Anderson
(74) *Attorney, Agent, or Firm* — Fitch, Even, Tabin & Flannery

(57) ABSTRACT

A tubular pressure vessel for cross-flow filtration having two centrally located side ports that penetrate the sidewall and communicate with a central chamber that divides the pressure vessel bore into two axially separated sections that each contain a plurality of cylindrical, cross-flow filtration cartridges. The pair of diametrically opposed, central side ports are provided through the use of a short length of tubing that provides structural stability to the overall pressure vessel arrangement. A feedstream may enter the pressure vessel centrally and flow in both axial directions, creating two permeate streams and two concentrate streams, the latter of which might exit through horizontal side ports located near each end of the pressure vessel. Interconnecting such tubular side port structures in adjacent pressure vessels in a vertical stack provides a load-bearing vertical column and allows a single feed line to supply multiple pressure vessels. When an array of such vertical stacks is used, horizontal side outlet ports for the concentrate streams can be likewise interconnected to provide combined concentrate outlet streams. Alternatively, two feed substreams may be pumped into each vessel through side ports near each end, and a combined concentrate stream removed through the central tubular side port structures.

8 Claims, 3 Drawing Sheets

U.S. PATENT DOCUMENTS

| | | | |
|---|---|---|---|
| 4,419,234 A * | 12/1983 | Miller et al. | 210/232 |
| 4,632,756 A | 12/1986 | Coplan et al. | |
| 5,002,667 A * | 3/1991 | Kutowy et al. | 210/321.75 |
| 5,137,631 A * | 8/1992 | Eckman et al. | 210/321.8 |
| 5,160,042 A * | 11/1992 | Bikson et al. | 210/321.8 |
| 5,230,796 A * | 7/1993 | Ter Meulen | 210/321.8 |
| 5,405,528 A * | 4/1995 | Selbie et al. | 210/232 |
| 5,407,571 A | 4/1995 | Rothwell | |
| 6,007,723 A * | 12/1999 | Ikada et al. | 210/650 |
| 6,083,390 A | 7/2000 | Hartmann | |
| 6,224,767 B1 | 5/2001 | Fujiwara et al. | |
| 6,302,448 B1 | 10/2001 | Van Der Meer et al. | |
| 2005/0029192 A1 | 2/2005 | Arnold et al. | |

FOREIGN PATENT DOCUMENTS

| | | |
|---|---|---|
| JP | 2001-219038 | 8/2001 |
| WO | 97/00120 | 1/1997 |
| WO | 0121290 A1 | 3/2001 |
| WO | 02051529 A1 | 7/2002 |
| WO | 03/051497 | 6/2003 |

OTHER PUBLICATIONS

International Search Report for PCT/US2005/013277 dated Jul. 18, 2005.

Michel C. Riemersma & Jan W. Post, Hydraulically optimised design increases productivity and reduces cost, Desalination & Water Reuse, pp. 26-29, vol. 13/2.

* cited by examiner

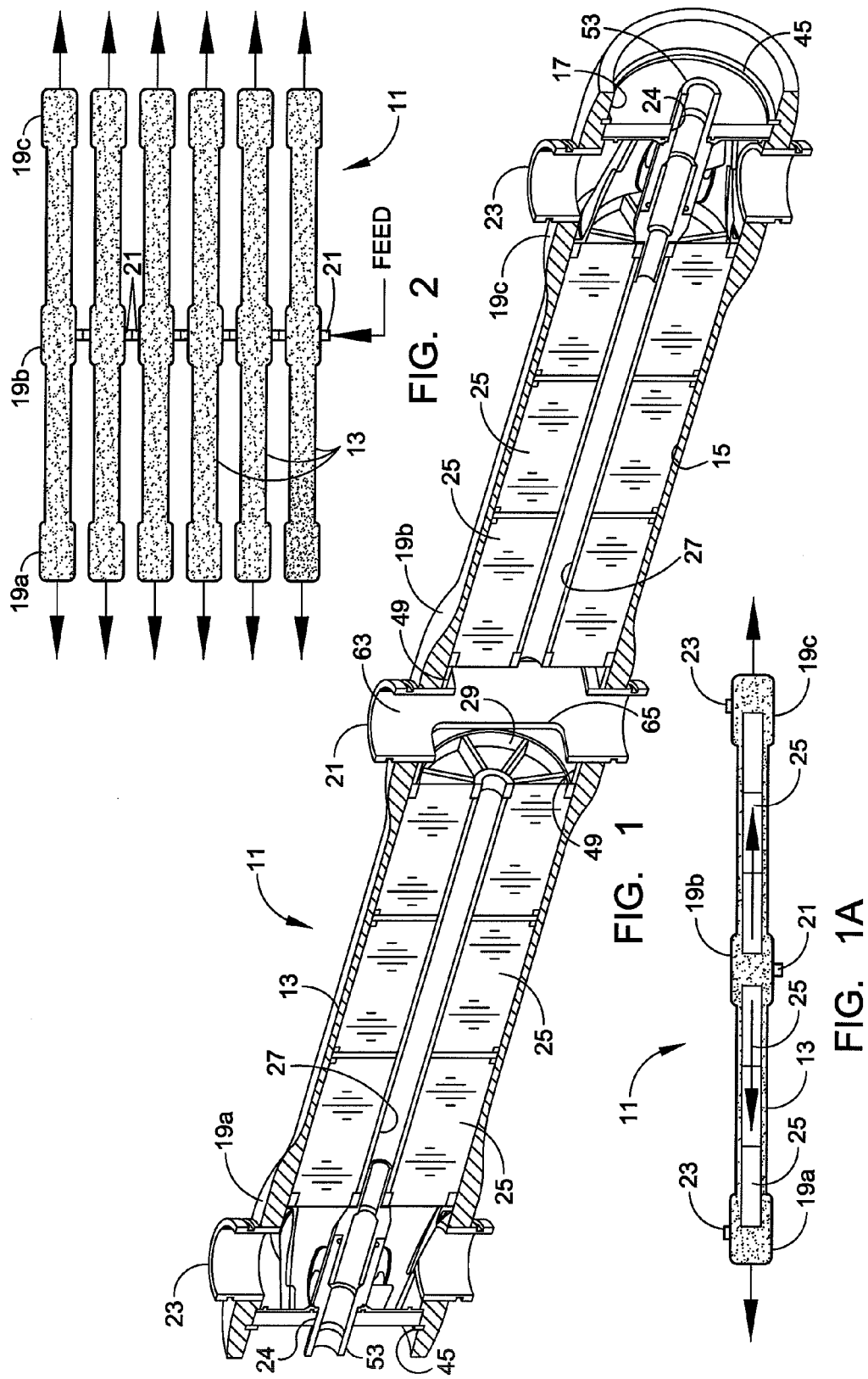

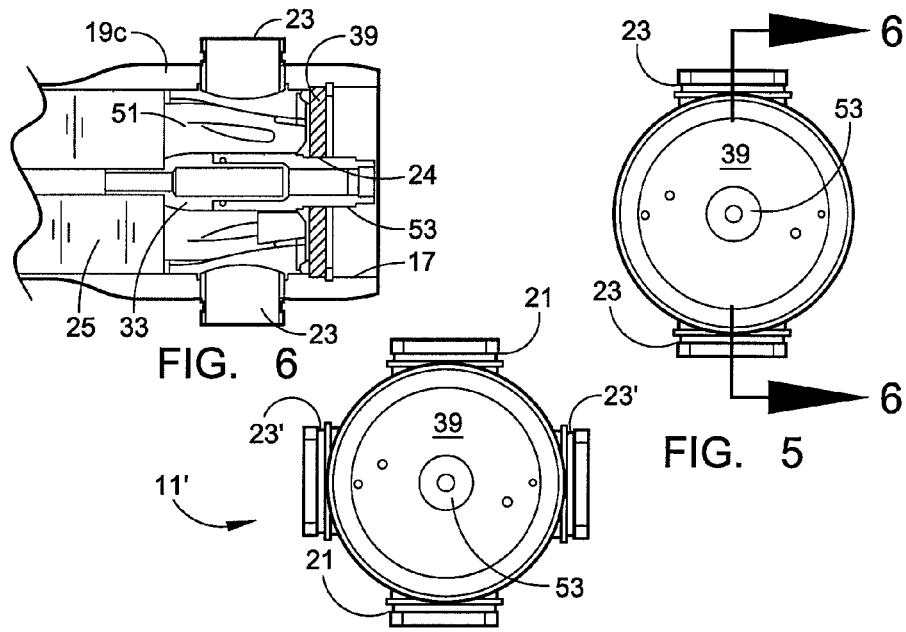
FIG. 6
FIG. 5
FIG. 7
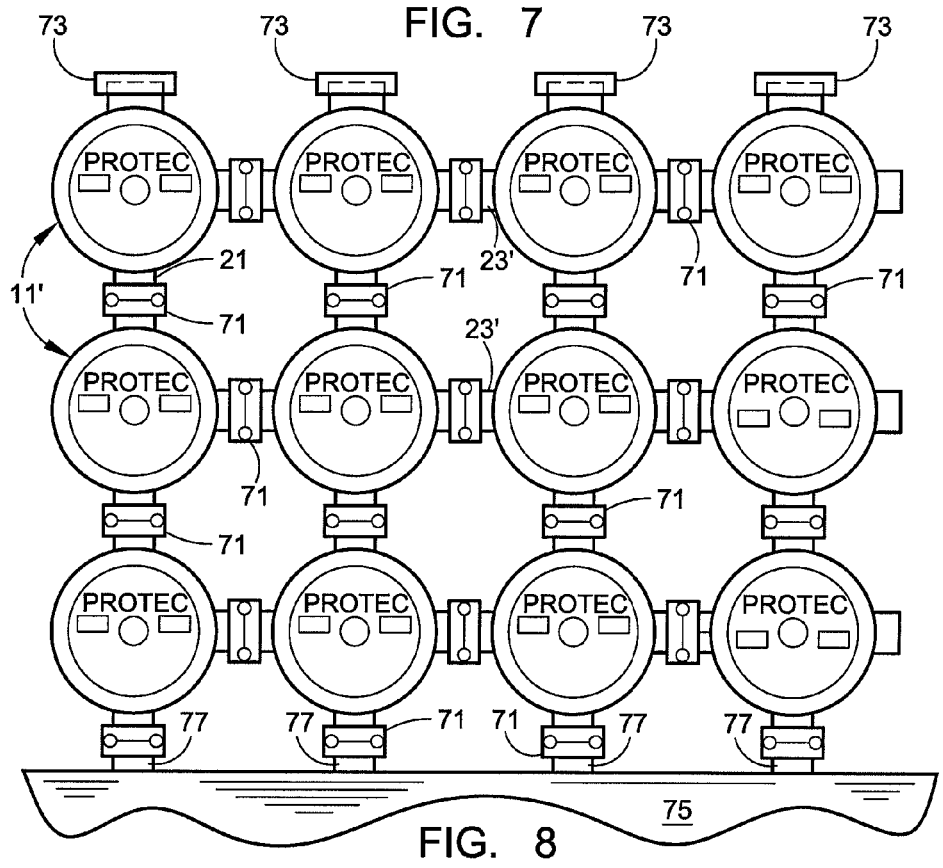
FIG. 8

PRESSURE VESSELS FOR HOLDING CYLINDRICAL FILTRATION CARTRIDGES

This application is a continuation of International Application No. PCT/US2005/013277, filed Apr. 18, 2005, which claims priority from U.S. Provisional Application Ser. No. 60/564,774, filed Apr. 22, 2004, the disclosures of both of which are incorporated herein by reference.

This invention relates to pressure vessels for holding a plurality of cylindrical cartridges for liquid treatment methods, and more particularly to pressure vessels of the type which have removable end closures that provide full-bore access to install and remove such cylindrical cartridges. Still more particularly, the invention relates to apparatus including such pressure vessels and to methods for treating liquids using crossflow filtration cartridges that separate a liquid feed into a permeate stream and a concentrate or retentate stream.

BACKGROUND OF THE INVENTION

Cylindrical pressure vessels for holding one or multiple cylindrical cartridges useful in separation methods, such as crossflow filtration, are shown in a number of U.S. patents, including U.S. Pat. Nos. 4,717,035, 4,517,085, 4,781,830, 5,866,001, 5,720,411 and 6,558,544. Crossflow filtration is a type of separation using semipermeable membranes where only a portion of the feed liquid passes through the semipermeable membrane, with the remainder of the liquid flowing across the membrane, often along axially extending spirally disposed passageways, and exiting from the other end of the filtration cartridge as concentrate. Such cylindrical cartridges generally employ multiple, spirally wound, sheetlike membranes which may variously be reverse osmosis (RO), nanofiltration (NF) or ultrafiltration (UF) membranes. In such an arrangement, there has traditionally been an entrance or feed port near one of the pressure vessel ends and at least two exit ports from the pressure vessel, i.e. one at the other end for the remainder of the feed which is now a concentrated stream and one for the permeate (which may exit at either or both ends); these exit ports are often located in the end closures.

When multiple cylindrical cartridges of this type are included within a single pressure vessel, the liquid feed has generally entered one end, flowed serially through all of the cartridges and then exited at the opposite end of the pressure vessel as a retentate or concentrate stream; the permeate flows spirally inward to a central porous permeate tube in the cartridge. In such an arrangement, each cartridge will have an open, anti-telescoping plate (ATP) at each end, and some type of a connector will interconnect the permeate tubes of adjacent cartridges to create a combined permeate flow path centrally of the pressure vessel. Exemplary connectors 22 are shown in the '085 patent, and in order to save space between cartridges in a row within a pressure vessel, such couplings may be designed to reside substantially entirely within the permeate tubes, thus minimizing the distance between ATPs of adjacent cartridges. The permeate may exit at one or both ends of the pressure vessel.

All such connections in a pressure vessel which are to be subjected to superatmospheric pressure should of course contain suitable seals to prevent leakage. Generally O-ring seals, as shown at 49 in the '830 patent are used, but elastomeric seals of square cross-section, such as item 117 in the '411 patent, have also been used. Effective seals, e.g. chevron seals, are often also provided between the circumference of the cartridge and the interior cylindrical wall of the pressure vessel.

For some three decades now it has been found economical to use large arrays of pressure vessels, each holding multiple cylindrical filtration elements, which arrays are sized to provide the necessary amount of total membrane surface area to accomplish the desired rate of overall filtration/separation of a feed liquid stream. One example of such an array is shown in U.S. Pat. No. 3,880,755 (Osmonics, Inc.) which illustrates a number of groups of parallel pressure vessels supported in stacked arrangement and plumbed to create a plurality of banks of vessels, with each pressure vessel containing a plurality of spiral wound membrane modules or cartridges arranged for serial flow therethrough. These vessels were primarily made for dairy or other food processing uses, and the pressure vessels and the fittings were often made of stainless steel. As shown in FIGS. 1 and 2 of the patent, each of the pressure vessels in a horizontal bank was individually plumbed to a manifold so that each bank of 4 pressure vessels at a given horizontal level share feed from a common manifold. During the 1980's and continuing into the 1990's, Osmonics, Inc., and other manufacturers provided pressure vessels for operation in arrays where pairs of side inlet ports were provided at diametrically opposite locations at one end, through which each parallel vessel was linked to the next adjacent pressure vessel; thus, in such an array, connection of a single feed conduit to the outside vessel in a bank provided liquid feed to all of the interconnected vessels in the planar bank.

Since that time, U.S. Pat. No. 6,007,723 has issued, which describes the construction of various interconnectors which might be employed to link together adjacent pressure vessels of this general type in vertical stacks. Approximately contemporaneously, DHV Water of the Netherlands developed a system which used a different arrangement in a pressure vessel of a plurality of such cylindrical cartridges for filtration and/or separation operation, and presented a paper in 2003 describing their Optiflux® design. The proposed design feeds liquid from both ends of a pressure vessel of enlarged diameter with respect to the diameter of the cartridges, and utilizes connectors that interconnect both the central permeate flow tubes and the exterior cylindrical surfaces of adjacent cartridges. Exemplary interconnectors for the cylindrical, spiral wound membrane cartridges are described in U.S. Pat. No. 6,302,448. As a result, in a pressure vessel holding, for example, six cartridges, a pumped feed stream enters each end and flows serially through three cartridges; the two concentrate streams meet in the center at a special connector which interconnects only the permeate tubes. So-called radial "space holders" are provided which create an annular channel between the exterior surfaces of the linked cylindrical cartridges and the interior wall of the vessel. The concentrate streams enter this annular passage at the special center connector, and they are then discharged from both ends of the pressure vessel.

Although these above-described improvements in both pressure vessels for holding cylindrical cartridges and in arrays for carrying out filtration operations have shown some promise, the search has continued for even more efficient apparatus and methods for utilizing cylindrical filtration cartridges or elements, particularly those of the spiral wound membrane type.

SUMMARY OF THE INVENTION

It has been found that, by providing central side ports in the sidewall of a pressure vessel for holding multiple cylindrical separation cartridges through the use of a structurally interconnected tubular structure that extends diametrically through the vessel housing, improved treatment methods and arrays of such pressure vessels can be created. Additional side ports are preferably provided in the sidewall of the pressure vessel adjacent each end. The arrangement is such that one or more cylindrical filtration or separation cartridges will be positioned between the side port at each end and the central side port within the cylindrical passageway that extends axially through the pressure vessel. An annular seal surrounding at least one end of each cylindrical cartridge will block liquid flow between the exterior of the cartridge and the interior of the pressure vessel. In the typical spiral wound membrane crossflow filtration cartridge, the permeate that is created flows spirally inward into a central permeate tube, and it may be arranged to exit from the pressure vessel at either or both ends thereof Arrays of such pressure vessels are arranged with at least three pressure vessels aligned parallel to one another in a vertical planar configuration, wherein a pair of oppositely disposed central side ports in each vessel are joined by interconnecting the tubular side port structures of adjacent vessels. The use of such a transverse tubular structure located centrally of each pressure vessel, which extends diametrically through the vessel and is structurally interconnected therewith, provides a stable structural arrangement for facilitating the interconnection of adjacent central side ports between adjacent vessels in such a vertical planar configuration where the vertical load is borne by such a column of coupled tubular structures.

In one particular aspect, the invention provides an apparatus for treating a feed liquid having dissolved and/or suspended components to create a permeate stream and a concentrate stream, which apparatus comprises a tubular pressure vessel having a tubular housing which defines an axial passageway extending between opposite end openings; end closures sealing both said end openings of said vessel in a manner to allow the insertion and removal of generally cylindrical cross flow filtration cartridges; a transverse tubular side port structure which penetrates the sidewall of said vessel housing at diametrically opposite circular openings at a longitudinally central location and provides two oppositely extending side ports, said transverse tubular structure being structurally interconnected with said tubular pressure vessel at said diametrically opposite penetrations; and at least one generally cylindrical separation cartridge disposed in said axial passageway at a location between said transverse tubular side port structure and each said end closure; said transverse tubular structure having opening means in its sidewall to provide communication between the axial passageway of said pressure vessel and said side ports, and said filtration cartridges having annular seals that seal against liquid flow between the periphery of each said cartridge and said housing interior surface that defines said axial passageway.

In one preferred array, there will be a plurality of such vertical planar configurations of parallel pressure vessels located adjacent one another, with the parallel pressure vessels arranged also in horizontal planar alignments. The additional side ports near the ends of each of the vessels are preferably oriented at 90° angles to the central side ports, and these additional side ports are preferably also provided in diametrically opposed pairs. The central side ports in the vertical planar configurations are interconnected with one another to create a supporting column, while the end side ports in each of the horizontal planar configurations of the array are respectively interconnected with one another to minimize exterior plumbing connections.

In one preferred arrangement, a feed stream is fed under pressure into the column of the central side port structures; feed into one of the pressure vessels at the top or bottom of the vertical stack results in feeding all of the pressure vessels in the stack. Feed flows axially from this central region toward each end of each pressure vessel passing through one or a plurality of such cylindrical cartridges and creating separate concentrate streams which reach each respective end region of each pressure vessel. The concentrate streams are pooled at each end by interconnecting the 90° oriented side ports to those of adjacent pressure vessels in horizontal planar configuration. The permeate created in each cylindrical cartridge flows in its central permeate tube to one of the interconnected central tubes and a combined permeate stream exiting from each group of interconnected filtration cartridges is removed through either one end or preferably through both ends of each pressure vessel, with such permeate exit openings generally being formed in the end closures.

In another particular aspect, the invention provides a method for treating a feed liquid having dissolved and/or suspended components using cross-flow filtration to create a permeate stream and a concentrate stream, which method comprises the steps of providing an array that includes a plurality of planar configurations of at least three pressure vessels arranged vertically, which pressure vessels have axial passageways, central side port tubular structures and additional side ports in the pressure vessel sidewall at each respective end of each pressure vessel wherein said central side port structures are respectively interconnected to one another to vertically align them in a straight line, and said additional side ports are aligned at, 90 degree angles to the central side port structures with additional side ports of the pressure vessels in one vertical configuration being each interconnected in fluid communication with a side port of a horizontally aligned pressure vessel in an adjacent vertical configuration, installing a plurality of cylindrical cartridges which include spiral wound membranes for crossflow filtration in the axial passageway in each pressure vessel, feeding a stream of such feed liquid through a first side port into each tubular pressure vessel so there is flow toward a second side port and through at least one cylindrical separation cartridge disposed in the axial passageway; and removing a concentrate stream exiting the cartridges by, withdrawing said concentrate stream from the vessel through the second side port.

BRIEF DESCRIPTION OF THE DRAWINGS

FIG. 1 is a schematic cross section view of a pressure vessel holding multiple cylindrical filtration cartridges showing an arrangement embodying various features of the invention.

FIG. 1A is a schematic view showing one method for using the pressure vessel of FIG. 1.

FIG. 2 is a schematic view showing one planar array in which pressure vessels of the type depicted in FIG. 1 may be employed.

FIG. 5 is an end view of the pressure vessel shown in FIG. 1.

FIG. 6 is a fragmentary cross sectional view taken along line 6-6 of FIG. 5.

FIG. 7 is an end view of an alternative embodiment of a pressure vessel similar to that shown in FIG. 1.

FIG. 8 is a schematic view showing a an array of parallel pressure vessels of the type shown in FIG. 7 arranged in a plurality of horizontal and vertical aligned banks of pressure vessels.

DETAILED DESCRIPTION OF THE PREFERRED EMBODIMENTS

Figure 3:
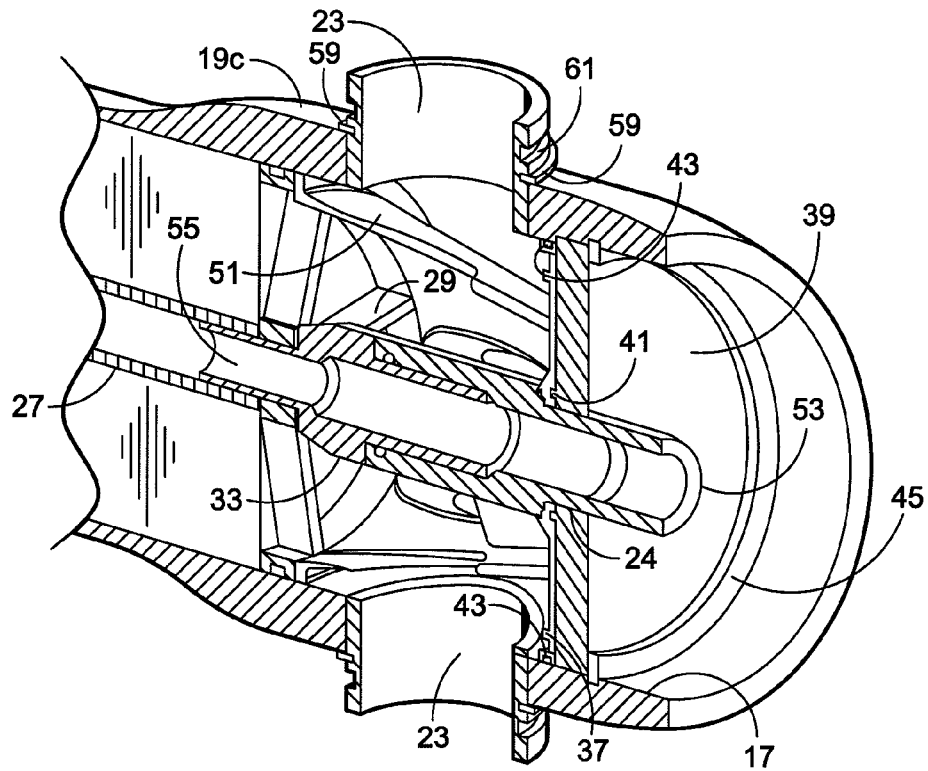
FIG. 3 is a fragmentary perspective cross-sectional view, shown enlarged in size, of the right hand end portion of the pressure vessel shown in FIG. 1.

FIG. 1 illustrates a pressure vessel 11 which includes a generally tubular shell or housing 13 which contains an axial bore 15 of substantially constant circular cross section throughout its entire length, with the exception of two slightly enlarged or counterbore regions 17 at the inlet and outlet ends, which counterbores are optionally provided. Both ends of the pressure vessel are preferably of identical construction; however, if desired for whatever reason, different end closures, as well known in this art, may be employed. The tubular shell 13 is greater in wall thickness at three locations, creating thickened regions 19a, 19b, and 19c which are located respectively at each end and in the center region of the tubular housing. In the embodiment shown, a central side port 21 is provided in the central thickened region 19b, and side ports 23 are provided in each of the end thickened regions 19a and 19c. Although such is the preferred embodiment, it should be understood that, if desired for a particular installation, a port could be provided in each of the removable end closures instead of the side ports 23, as is well known in this art. Permeate exit openings 24 are preferably provided at each axial end of the pressure vessel in the removable end closures. Alternatively if desired, a tubular connection could be provided between the facing ends of the two central filtration cartridges so that all of the permeate can be removed from either end as desired.

The tubular shell 13 can be made of any suitable material that has the strength and stability to withstand the superatmospheric pressure to which the pressure vessel 11 will be subjected during operation. Although stainless steel or other corrosion-resistant alloys may be used, the most popular construction for pressure vessels of this type today is that of fiber-reinforced polymeric resin material, e.g. fiberglass-reinforced epoxy or polyurethane resin. For example, to accommodate six spiral-wound cartridges each having individual lengths of about 40 inches, a pressure vessel would be employed that has an overall length in the neighborhood of 270 inches, including the thickened or bell end portions 17 that are each about 10 inches in length at each end.

Shown in FIG. 1, for purposes of illustration, are six cylindrical cartridges 25 that are appropriately interconnected in end-to-end arrangement, as two sets of three each, within the elongated tubular shell 13; however, it should be understood that varying numbers of cartridges 25 may be used and the length of the pressure vessel adjusted accordingly. Portions of the two cartridges 25 in one row are illustrated in FIG. 3. Each cartridge 25 has a central permeate tube 27 about which a sandwich of sheetlike semipermeable membrane and flow channel-providing sheet material is spirally wound, as is well known in this art. At each end, an anti-telescoping plate (ATP) 29 is attached, which is of wagon-wheel design; such is also standard in this art to eliminate potential axial shifting of wrappings within the spiral-wound assembly. The cylindrical cartridge 25 is of a diameter so as to be closely accommodated within the bore 15 of the pressure vessel, and at least the upstream end of each cartridge contains a chevron or other suitable seal 31 surrounding the outer perimeter of the ATP, which may be seated in a peripheral groove therein and assures that the entirety of the feed flow is directed through the axially extending passageways in the spirally-wound cartridge and does not bypass about the exterior of the cartridge. The central permeate tube 27 is porous along a major portion of its length, containing a plurality of holes which allow permeate flowing spirally inward in the semipermeable membrane envelopes to enter the hollow permeate tube 27, as well known in this art. Adjacent cartridges 25 are interconnected through standard coupling devices so that all of the permeate tubes 27 in each set of cartridges are coupled into a single permeate passageway leading to a permeate outlet adaptor or fitting 33 which extends through the central opening 25 in the removable end closure of the pressure vessel 11.

Any suitable end closure for a pressure vessel of the types well known in this art may be used; for example, one such as those shown in the '830 and the '001 patents may be used. The end closure is designed to provide full-bore access to the axial passageway 15 so that cylindrical cartridges 25 can be inserted and removed from either end. The task of insertion and removal is eased as only three cartridge need be inserted from each end, as opposed to inserting all six in a comparable traditional pressure vessel. Basically, the illustrated removable end closure includes an inner seal plate 37 (FIG. 3), that may be made of thermoplastic material, such as PVC, which is located in juxtaposition with the interior surface of an outer metal bearing plate 39. The seal plate 37 carries an inner annular seal 41, that seals the junction where the outlet fitting 33 passes through the seal plate, and a peripheral annular seal 43 (see FIG. 3) where the seal plate approaches the interior of the bore 15 of the pressure vessel and which might alternatively be a chevron seal. As known in this art, the outer bearing plate 39 has a perimeter region of slightly greater diameter that is accommodated in the counterbore region 17 of the pressure vessel; thus, it seats against an annular shoulder in the tubular shell 13. Once in position, the bearing plate 39 is secured in place by a snap ring 45 or a spiral ring (such as that shown in U.S. Pat. No. D468,392) that seats in an annular groove cut in the internal surface of thickened end of the pressure vessel 17 to a depth equal to about one-half the radial width of the snap ring, as well known in this art. A small diameter snap ring (not shown) may also be used to lock the permeate outlet fitting 33 to the juxtaposed seal plate 37 and bearing plate 39.

Figure 4:
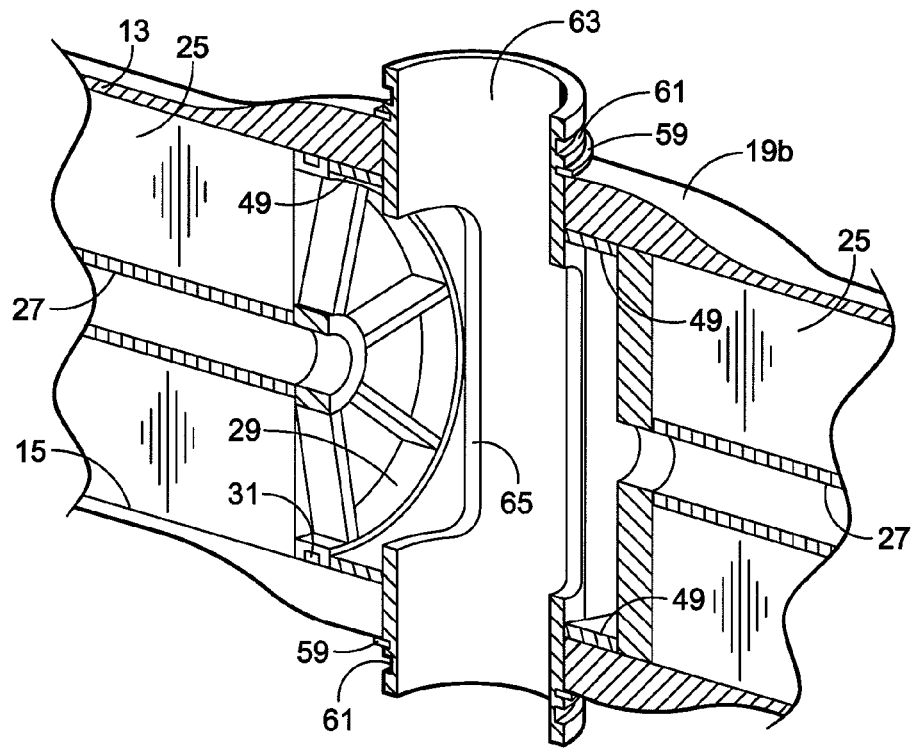
FIG. 4 is an enlarged fragmentary perspective cross sectional view of the central region of the pressure vessel shown in FIG. 1.

Within the pressure vessel itself, there is a central tubular spacer 49 (FIG. 4) located in the central region as a liner which serves as a stop against which the inlet ends of the two centermost cylindrical cartridges 25 will seat in the preferred embodiment. Spacers 51 are also provided at the two end regions of the pressure vessel, which create short plenum chambers at each end where concentrate collects and flows to the side ports 23. In the preferred embodiment, each end spacer 51 is generally frustoconical in shape, and it contains a plurality of apertures to allow liquid passage radially therethrough between the interior of the plenum chamber and the outer region adjacent the side ports 23, as best seen in FIG. 3. Each end spacer 51 extends between the seal plate 37 surface of the end closure and the outermost cylindrical cartridge 25 in the pressure vessel. The outlet fitting 33 occupies the central portion of the plenum chamber. It has a spigot portion 53 that extends through the central opening 25 in the end closure plate 39 and has an inner end portion 55 of tubular shape and proportion that is received within the permeate tube 27 of the cylindrical cartridge; the end portion carries a suitable seal, such as one or more O-rings, in order to seal its connection with the permeate tube 27.

The side ports 23 are simply provided by conventional fittings that are seated in openings drilled or otherwise formed in the enlarged, i.e. thickened, sidewall portions 19a and 19c near the ends of the pressure vessel wall. Each may simply be a short section of tubing formed with a short radial flange near its inner end that will snugly seat in a counterbore (not shown) in the interior surface of the pressure vessel sidewall where an O-ring seal would be conveniently provided. A groove in the outer wall of the fitting at a location at the exterior surface of the enlarged pressure vessel region 19c accepts a snap ring 59 that secures the fitting in place. A wider groove 61 is provided above the snap ring 59 near the outer end of the short tubular section and provides for attachment of a surrounding coupling or other connector, as well known in this art.

A similar side port fitting can be provided centrally of the pressure vessel in the enlarged regions 19b, and such might be used when only a single side port 21 is desired in a pressure vessel as depicted in schematic FIG. 1A and in the top vessel in FIG. 2. However, when a pair of the diametrically opposed outlets 21 are desired centrally in the pressure vessel 11, they are advantageously constructed by the use of a tubular structure in the form of a length of tubing 63 which is slightly longer than the outer diameter of the pressure vessel at this point. The tubing extends completely through the pressure vessel and is seated in holes drilled or otherwise formed diametrically through the thickened sidewall portion 19b of the pressure vessel and the central spacer 49. To secure the tubular structure 63 to the pressure vessel, a pair of narrow grooves in its outer surface receive snap rings 59 as before that seat in abutting contact with the outer surface of the thickened sidewall region 19b of the pressure vessel and structurally interconnect the tubular structure 63 and the pressure vessel 11. A pair of adjacent wider grooves 61 facilitate attachment of an exterior coupling or connector thereto to join the tubular structures 63 of adjacent pressure vessels (see 71 in FIG. 8). A suitable seal (not shown) is provided between the exterior surface of the tubular structure 63 and the interior surface of the opening that penetrates the pressure vessel sidewall. A pair of large openings 65 of preferably generally rectangular shape are provided at diametrically opposite central locations in the sidewall of the tubular structure 63; they provide liquid communication between the interior of the tubular structure 63 and the axial bore 15 of the pressure vessel in both directions. The strength and integrity of the tubular structure 63 that extends diametrically through the pressure vessel provides rigidity and reliability to, for example, a vertical stack of such pressure vessels where the interconnected tubular structures 63 serve to create a vertical supporting column, as depicted in FIG. 2. Alternatively, such structures could be used to interconnect pressure vessels in a comparable horizontal planar configuration. In such an array, the pressure vessels are supported in parallel relationship to one another and located so that adjacent ends of the tubular structures 63 that define the central side ports of adjacent vessels abut each other. The adjacent ends are then interconnected to each other with a surrounding tubular clamp or other coupling 71 that seals the liquid connection therebetween.

Although details are omitted in FIG. 2, the arrangement shows that only a single feed stream needs to be plumbed to supply feed liquid to be treated to all six pressure vessels 11 in a vertical bank or stack. Interconnections between the tubular structures 63 in this central column is such that the single incoming feed stream is distributed to all six pressure vessels. As a result, a portion of the feed stream splits in each pressure vessel and flows axially toward each end of the respective pressure vessel, passing through the rectangular openings 65 that provide access to the axial bore. Although not shown, the concentrate outlets in the enlarged regions 19a and 19c at both ends of the tubular housing 13 can also be provided in diametrically opposed locations (as shown in FIG. 3) to allow combination of the concentrate streams from adjacent vessels at each end of the vertical stack, generally similar to the interconnections between the tubular structures 63. Alternatively, the side ports 23 can be oriented at 90° to the locations shown in FIG. 3; FIG. 7 shows such an arrangement where concentrate streams will exit in one or both horizontal directions from each end. In any of these configurations, if the side ports are provided as diametrically opposed pairs and if it is decided not to use one of the side ports in a particular plumbed arrangement, a simple cap 73 is substituted for a coupling to seal the port not being used (see FIG. 8).

One use for the pressure vessel is the simple arrangement depicted schematically in FIG. 1. In this arrangement, a single feed inlet 21 is employed to deliver the liquid feed to be treated centrally of the housing 13 of the pressure vessel, whence it flows in opposite axial directions through two sets of three cylindrical crossflow filtration cartridges 25 arranged serially in end to end relationship. A chevron seal 31 or the like is provided at the end of each cartridge 25 facing the center, when the flow of feed liquid will be from that direction through the cartridge; however, annular seals are preferably provided at each end of each cartridge. Permeate exits the pressure vessel through openings in the end closures at both ends thereof as depicted by the arrows. Concentrate exits through single side ports 23 in a vertically upward direction at each end. Alternatively, the feed could be pumped into the pressure vessel as two streams through the side ports 23 adjacent each end, and the concentrate would then exit the pressure vessel through the central side port 21. The permeate flow would remain unchanged. If different seals are used at the high pressure and low pressure end of each cylindrical cartridge 25, then the seals would be reversed from those used in the arrangement depicted in FIG. 1A.

As previously mentioned, FIG. 2 shows a planar configuration where six parallel pressure vessels 11 are serially interconnected with one another at the central feed side ports 21 through which the feed liquid is pumped. Such would likely be of vertical orientation, but it could be alternatively horizontally oriented. The permeate, produced by each set of serially arranged cylindrical cartridges located respectively in the two chambers that are created by the tubular spacers 49, conveniently exits through the closer end closure as indicated by the short arrows. Usually these six permeate outlets at each end of such a planar array would be plumbed together with a header (not shown). As earlier mentioned, the concentrate outlets could be arranged as shown in FIG. 1 and also interconnected with one another, so that concentrate flow reaching each end of the stack might be removed via the uppermost or lowermost pressure vessel, as desired. Alternatively, as also previously mentioned, the concentrate streams may be removed from the respective ends of the vessels in horizontal directions, and such an arrangement is illustrated hereinafter with respect to an alternative array of vessels illustrated in FIG. 8.

An end view of a pressure vessel 11 having the construction shown in FIG. 1 is illustrated in FIG. 5, which shows the permeate outlet 53 emerging from the face of the end closure plate 39 with side ports 23 for concentrate discharge arranged in vertical alignment above and below the end closure of the vessel. The cross-sectional view shown in FIG. 6 illustrates the end plenum chamber provided by the generally frustoconical spacers 51 and shows the elongated tear drop-shaped openings in the sidewall of this spacer. These openings provide a path for liquid communication whereby liquid exiting the axial end of the last spirally wound membrane cartridge in the group can reach and the annularly outer region of the chamber at each end of the pressure vessel, where entrances to the side ports 23 are located.

FIG. 7 is an end view, similar to FIG. 5, of an alternative pressure vessel 11' where the central side ports 21 are aligned vertically as shown in FIG. 1, but each pair of diametrically opposed side exit ports 23' is oriented along a horizontal transverse axis. This construction facilitates the installation of an array of parallel pressure vessels that are arranged in both vertical and horizontal banks as depicted in FIG. 8. It should, of course, be understood that a much larger array could be used depending upon the amount of separation membrane surface area felt desirable to carry out daily production at desired rates.

In the FIG. 8 illustrated arrangement, twelve pressure vessels 11' are arranged in four vertical stacks of three vessels each. The central side ports 21 of adjacent vessels are interconnected by suitable couplings 71 creating central vertical columns in the vertical stack. Similar couplings 71 are used to horizontally interconnect the side ports 23' of adjacent vessels at respective ends of the pressure vessels in the three vertical banks. The center side port 21 at the top of the uppermost pressure vessel in each vertical column of side port tubular structures 63 is closed with a suitable cap 73. Should it be desirable, for efficiency of production, to produce all of the pressure vessels 11' with a pair of diametrically opposed side ports 23' at each end, then similar caps 73 could be used to close any of these outlets on the pressure vessels in one of the outermost vertical stacks when there is no desire to remove a concentrate stream from such outlet. The array is shown as being fed from an underlying tubular header 75. As a result, a rising feed stream is supplied to pressure vessels in each of the vertical stacks from the short inlet pipes 77 which are each connected to the central side port of the lowest pressure vessel in each vertical stack using similar couplings 71.

In the array illustrated in FIG. 8, twelve pressure vessels 11' are being supplied with feed liquid in the central region of each as a result of the four rising columns of liquid. These four rising columns of liquid flow split in each central chamber, with some flow being directed through each large axial opening 65, creating twenty-four horizontally flowing substreams of feed liquid. The substreams each enter the innermost cartridge 25 in each set of three serially arranged cartridges located on each opposite axial end of each pressure vessel and then flow serially through the next two cartridges. A collective permeate stream from each set of three cartridges preferably flows out the central spigot 53 at each pressure vessel end, where these spigots would be appropriately manifolded. Twenty-four concentrate streams are also created, with at least two exiting from locations near the respective ends of each of the twelve pressure vessels. In the illustrated arrangement, these twenty-four concentrate streams within the pressure vessels are combined to provide six collective horizontal concentrate exit streams, which exit from the right hand side port at each end of the three pressure vessels in the right hand stack in FIG. 8.

Alternatively, if as mentioned hereinbefore the feed liquid were supplied to each pressure vessel as two substreams through the side ports adjacent the respective ends of each vessel in the array of 12 vessels depicted in FIG. 8, there would be 24 substreams of feed liquid; such could be provided from six horizontally flowing streams, three at each end of the array. In this arrangement, the two concentrate streams produced in each pressure vessel are combined and would exit the central side ports provided by the tubular structures 63, and the four columns of tubular structures would convey the concentrate downward into the underlying tubular header 75 which would thus serve as the concentrate collection header.

It can be seen that the use of such an array has such a number of operating advantages. Better membrane performance is obtained because of relatively shorter flow path lengths, e.g., the pressure-driven stream of feed liquid need flow only through three serially aligned cartridges rather than six. There will also be a higher recovery potential for such a separation operation because the last cartridge in the row of three will receive a feed having a lower solute concentration than would the last cartridge in a row of six serially aligned cartridges. It is also expected that these shorter flow paths will result in less fouling and that a lower amount of cleaning chemicals will be needed. The shortened permeate path will also facilitate the ability to handle the next generation of separation membrane cartridges that may be fabricated having larger diameters so they will contain greater amounts of membrane surface area per cartridge. The design would also facilitate the creation and use of even longer pressure vessels (which might, for example, accommodate 8 or 10 standard, 40-inch cartridges per pressure vessel, as two sets of 4 or 5) without having to accommodate above normal pressure drops for desired operation. Moreover, when compared to operations where traditionally small pressure vessels have been employed, it can be seen that a single pressure vessel of the improved design can serve the function of two smaller pressure vessels and thus reduce the number of heads and end closures required. Moreover, when stacks of, e.g., 6 or 7, pressure vessels are employed, there is a smaller footprint for the array and potentially lower system capital costs as a result of simplified feed and/or concentrate piping.

Although the invention has been described with regard to certain preferred embodiments which constitute the best mode know to the inventors at the present time for carrying out this invention, it should be understood that various changes and modifications as would be obvious to one having the ordinary skill in this art may be made without departing from the scope of the invention which is defined by the claims appended thereto. Although the invention is expected to be most advantageously used in pressure vessels that will hold four or more cartridges, it will also be seen that it can be used with advantage where only a single cartridge is located on each side of the center in a pressure vessel. The disclosures of all U.S. patents referenced herein are expressly incorporated herein by reference. Particular features of the invention are emphasized in the claims which follow.

The invention claimed is:

1. Apparatus for treating a feed liquid having dissolved and/or suspended components to create permeate streams and concentrate streams, which apparatus comprises:
   a. a plurality of tubular pressure vessels each having a single horizontally disposed tubular shell which provides an interior passageway surface of substantially constant circular cross section extending axially for nearly its entire length between opposite end openings through which generally cylindrical separation cartridges can be inserted and removed;
   b. removable end closures which seal both said end openings of said vessel which may be removed to allow the insertion and removal of generally cylindrical crossflow filtration cartridges;
   c. a transverse tubular side port structure which penetrates the sidewall of each said vessel shell at diametrically opposite circular openings at a longitudinally central location in said tubular shell and provides two vertically opposite tubular side ports of circular cross section that protrude therefrom, said transverse tubular structure being structurally interconnected with said tubular pressure vessel at said diametrically opposite penetrations and dividing said axial passageway into two horizontal sections;

d. a plurality of generally cylindrical separation cartridges disposed in each said horizontal section so as to flank said transverse tubular side port structure, which have annular seals that seal against liquid flow between the periphery of each said cartridge and said interior passageway surface;

said transverse tubular structure having diametrically opposite openings in its sidewall within said vessel passageway to provide communication between each of said horizontal passageway sections, and said horizontal tubular pressure vessels being arranged in generally parallel alignment with one another with at least two pressure vessels aligned in a vertical planar configuration, and e. couplings which respectively interconnect in a vertical direction said central side port tubular structures of said pressure vessels in said vertical planar configuration in vertical alignment so that said aligned tubular structures form a vertical load-supporting column.

2. The apparatus according to claim 1 wherein said couplings surround the outer surfaces of said central side port structures.

3. The apparatus according to claim 1 wherein each said vessel includes a central tubular liner that has a pair of diametrically opposed circular openings through which said side port structure passes, which liner lies adjacent said interior surface of said pressure vessel shell and serves as a spacer against each end of which is seated one of said plurality of cartridges in each said horizontal passageway section.

4. The apparatus according to claim 1 wherein at least two additional side ports are provided in each said pressure vessel shell, with one of said additional side ports being positioned generally adjacent to each axial end and wherein at least one of said end closures has a permeate stream exit port formed therein.

5. The apparatus according to claim 1 wherein said plurality of tubular pressure vessels comprises an array which includes multiple said vertical planar configurations of at least two pressure vessels, wherein said additional side ports in the shell of each said pressure vessel at each respective end thereof are aligned at a 90 degree angle to said central side port structures and wherein said additional side ports of said pressure vessels in one said vertical planar configuration are interconnected in fluid communication in a horizontal direction with a side port of a horizontally aligned pressure vessel in an adjacent vertical planar configuration.

6. A method for treating a feed liquid having dissolved and/or suspended components using cross-flow filtration to create permeate streams and concentrate streams, which method comprises the steps of:

a. providing an array that includes a plurality of vertical planar configurations of at least two horizontal pressure vessels, which pressure vessels have axial interior passageways which are each divided into two passageway sections by vertical tubular structures which penetrate said vessel and provide oppositely disposed central side ports and which pressure vessels have additional side ports at each respective end of each pressure vessel which are aligned at 90 degree angles to the central side ports, b. respectively interconnecting said vertical tubular structures of said pressure vessels in each vertical planar configuration to create a load-bearing vertical column and a first set of interconnected intermediate side ports, c. respectively interconnecting the additional side ports of said pressure vessels in one vertical planar configuration in fluid communication with a side port of a horizontally aligned pressure vessel in an adjacent vertical planar configuration to provide a second set of interconnected side ports, d. inserting a plurality of cylindrical cartridges for cross-flow filtration through each end of the pressure vessel so that a plurality of cylindrical cartridges reside in each passageway section so as to flank the central side port structure, e. feeding a stream of such feed liquid through one of said first and second sets of interconnected side ports of said array of tubular pressure vessels to cause flow through said plurality of separation cartridges that are disposed in each passageway section and create permeate and concentrate streams, and f. removing combined concentrate streams from multiple pressure vessels by withdrawal through the other set of interconnected side ports.

7. The method according to claim 6 wherein the feed liquid is supplied under pressure through said second set of side ports to create two substreams in each pressure vessel which flow axially toward each other, and wherein concentrate streams resulting from said two feed substreams are combined and exit through said first set of interconnected intermediate side ports provided by the central tubular structure of each said pressure vessel.

8. The method according to claim 6 wherein the feed liquid is supplied under pressure to the array of such tubular pressure vessels through the first set of side ports provided by the load-bearing vertical column of said interconnected side port structures and flows horizontally through each passageway section, producing two concentrate streams in each respective pressure vessel, which streams are removed via said second set of interconnected side ports and combined with concentrate streams from adjacent vessels that are horizontally aligned therewith.

* * * * *